United States Patent [19]

Agahi et al.

[11] Patent Number: 5,553,458
[45] Date of Patent: Sep. 10, 1996

[54] NONCONTAMINATING ENERGY DISIPATOR AND A METHOD FOR OPTIMIZING TURBOEXPANDERS

[75] Inventors: Reza R. Agahi, Granada Hills; Behrooz Ershaghi, Irvine, both of Calif.

[73] Assignee: Rotoflow Corporation, Gardena, Calif.

[21] Appl. No.: 534,734

[22] Filed: Sep. 27, 1995

Related U.S. Application Data

[63] Continuation of Ser. No. 207,877, Mar. 8, 1994, abandoned.
[51] Int. Cl.$^6$ .................................................. F25B 9/00
[52] U.S. Cl. ................................................. 62/87; 62/402
[58] Field of Search .................. 62/87, 402; 415/18, 415/123

[56] References Cited

U.S. PATENT DOCUMENTS

| | | | |
|---|---|---|---|
| 3,221,511 | 12/1965 | Garrett | 62/172 |
| 3,321,930 | 5/1967 | LaFleur | 62/402 |
| 4,169,361 | 10/1979 | Baldus | 62/402 |
| 4,170,116 | 10/1979 | Williams | 62/402 |
| 4,646,524 | 3/1987 | Kawashima et al. | 62/402 |
| 5,038,583 | 8/1991 | Gali | 62/402 |
| 5,107,682 | 4/1992 | Cosby | 62/402 |

*Primary Examiner*—Ronald C. Capossela
*Attorney, Agent, or Firm*—Lyon & Lyon

[57] ABSTRACT

A closed-loop system that dissipates energy from an expander and does not contaminate the expander. The noncontaminating energy dissipator has a closed-loop conduit that is connected to a compressor, a pressure reduction valve and a heat exchanger. A brake gas circulates in the closed-loop conduit from the compressor to the pressure reduction device, then to the heat exchanger and finally back to the compressor, where the process repeats. The use of an inert brake gas prevents interactions between the brake gas and a hazardous process fluid from forming an explosive mixture. The closed-loop conduit has an outlet so that the brake gas can be used for purposes other than circulating through the closed-loop. A make-up conduit and another control valve can be added to the noncontaminating energy dissipator so that brake gas that is lost through seals or other parts of the system can be readily replaced. The noncontaminating energy dissipator can be used to expend excess expander energy in such a way as to optimize the operation of the turboexpander.

15 Claims, 2 Drawing Sheets

NONCONTAMINATING ENERGY DISIPATOR AND A METHOD FOR OPTIMIZING TURBOEXPANDERS

This application is a continuation of application Ser. No. 08/207,877, filed Mar. 8, 1994, abandoned.

BACKGROUND OF THE INVENTION

The field of the present invention is systems for dissipating energy from rotary equipment.

Radial inflow turbines used to recover energy from pressurized gases as they are expanded are commonly referred to as turboexpanders. Such devices are widely used in air separation, natural gas liquification, ethylene plants, hydrogen purification, methyl-tertiary-butyl-ether (MTBE) processes, helium liquification, and geothermal energy recovery by Rankin Cycle among other applications. Three recent patents dealing with particular aspects of such turboexpanders are U.S. Pat. Nos. 4,287,758, issued Sep. 8, 1981; 4,300,869, issued Nov. 17, 1981; and 4,789,300, issued Dec. 6, 1988, the disclosures of which are incorporated herein by reference.

A process fluid or gas is presented in pressurized form to the turboexpander where the gas is expanded, resulting in a gas of lower pressure. The expansion of the gas provides rotational energy to the turboexpander. This expander energy may then be restored to the system by powering generators, blowers, compressors, pumps and the like or may be used for other purposes.

When such devices are employed in situations to achieve opportunistic energy recovery, the supply of process gas may not necessarily create continuous and sufficient rotational energy in the turboexpander. One may not want to recover expander energy when the expander energy is insufficient to warrant its recovery, when the availability of expander energy is intermittent, or when such recovery is not required by the end user for some other reason. In this case where expander energy is not recovered, expander energy must still be consumed, expended or otherwise dissipated to prevent damage to the turboexpander. Thus, the turboexpander still requires the provision of a load on the device.

Several methods to dissipate expander energy have been developed. Air blowers and oil brakes are two of the most widely used mechanisms for energy dissipation. Air blowers serve as a load to dissipate unwanted expander energy by using expander energy to power a fan. Similarly, oil brakes waste expander energy by acting as inefficient oil pumps.

When turboexpanders are utilized in cryogenic processes (i.e. processes which run at very low temperatures), any oil mist or droplets which migrate into the expander may greatly disrupt the process because the oil droplets will freeze in heat exchangers and will clog gas flow passages. This problem presents a major hazard for cryogenic processes.

Migrating droplets of oil or other lubricants may originate from various sources such as oiled or lubricated bearings. Although seals, such as shaft seals, prevent much of the oil in bearings from migrating to the expander, some oil leakage is inevitable. As a result, process plants have welcomed magnetic bearings which are oil-free. However, neither the air blower nor the oil brake is the preferred load when an expander having magnetic bearings is used to expand a hazardous fluid such as natural gas or hydrogen gas. An air blower may leak air into the turboexpander which may interact with the hazardous process fluid to form an explosive or highly combustible mixture. The use of an oil brake, on the other hand, defeats the purpose of substituting magnetic, oil-free bearings for oiled bearings since the oil brake subjects the process to the risk of oil contamination. Also, oil droplets from the oil brake are incompatible with the magnetic bearings.

SUMMARY OF THE INVENTION

The present invention is directed to a closed-loop energy dissipator.

In one separate aspect of the present invention, the closed-loop energy dissipator has a closed-loop conduit wherein a gas circulates. During operation, the energy dissipator does not contaminate the turboexpander with oil droplets and other harmful lubricants.

In another separate aspect of the present invention, an inert brake gas circulates in the closed-loop energy dissipator. The use of an inert gas reduces the risk of hazardous interactions between the brake gas and the process fluid.

In yet another separate aspect of the present invention, the closed-loop energy dissipator allows the brake gas to be used for purposes other than circulating through the closed-loop. A make-up conduit and control valve permit the replenishing of brake gas that is lost through seals or other parts of the system.

In still another separate aspect of the present invention, one can adjust the speed of the turboexpander by controlling the pressures within the closed-loop energy dissipator, thereby optimizing the thermal efficiency of the turboexpander.

In another separate aspect of the present invention, one can adjust the axial load balancing of a turboexpander by controlling the pressures within the closed-loop energy dissipator.

Thus, it is an object of the present invention to provide improved energy dissipation systems. Other and further objects and advantages appear hereafter.

DETAILED DESCRIPTION OF THE PREFERRED EMBODIMENT

Figure 1:
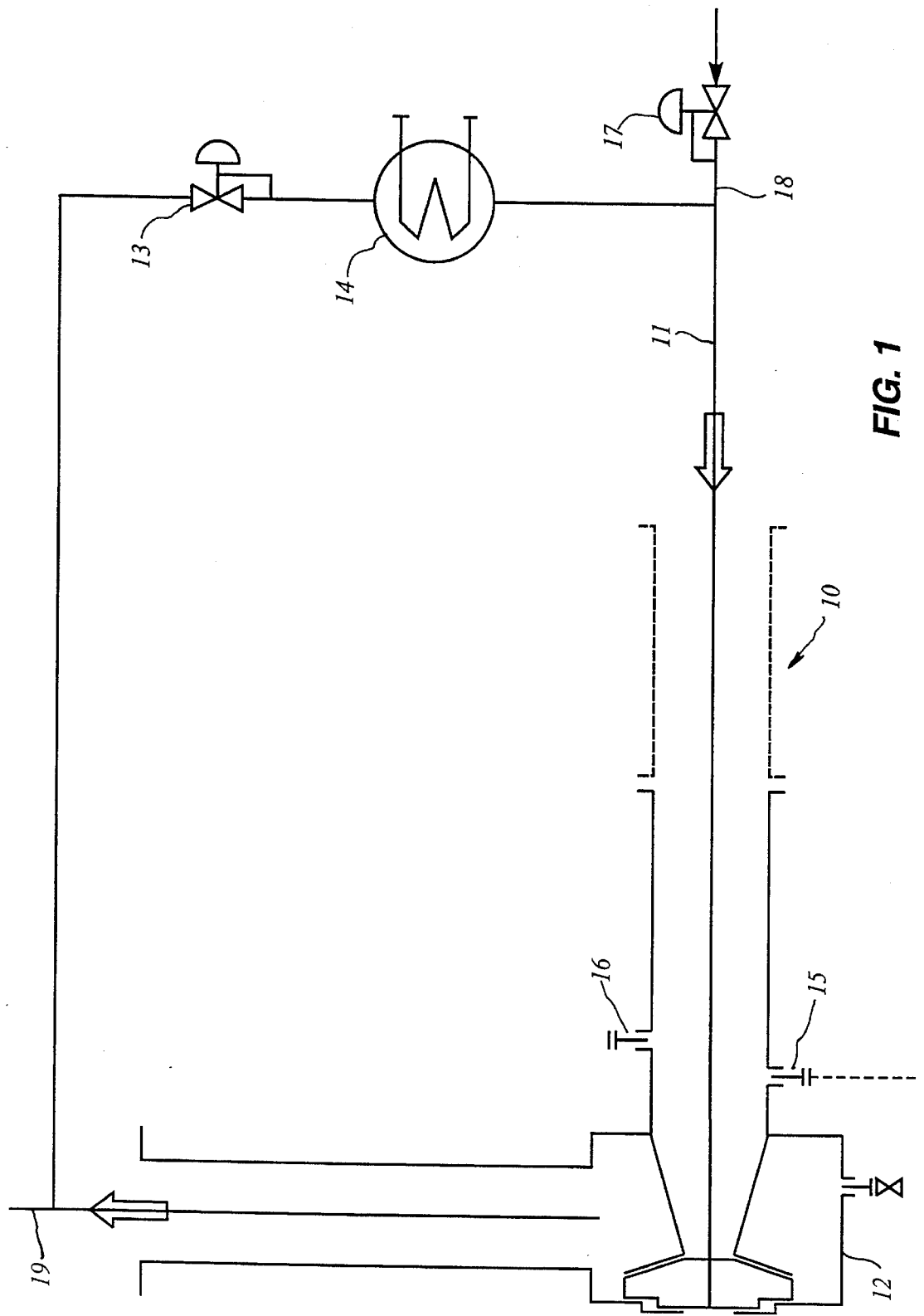
FIG. 1 is a diagram of the noncontaminating energy dissipator.

Referring now to FIG. 1, a noncontaminating energy dissipator 10 is illustrated. The dissipator includes a closed-loop conduit 11 which connects to a compressor 12, a pressure reduction valve 13 and a heat exchanger 14. The conduit 11 contains a brake gas which circulates in a closed-loop fashion.

In this embodiment, the compressor 12 is a centrifugal compressor, powered by expander energy. The brake gas that enters the compressor 12 is compressed, thereby bringing the brake gas to a higher pressure and higher temperature. The heated, compressed brake gas is released into the conduit 11 and makes its way to a pressure reduction valve 13. The pressure reduction valve 13, which can be any kind of control valve, expands the compressed gas so that the pressure of the gas is reduced back to or near the pressure of the pre-compressed gas. The decompressed gas, which is still heated, then circulates in the conduit 11 to a heat exchanger 14. The heat exchanger 14 removes heat from the gas. No particular heat exchanger is required as many kinds would work with the system. The heat exchanger 14 is preferably located after the pressure reduction valve 13 along the closed-loop path defined by the conduit 11 because heat exchangers that cool fluids of lower pressures are less expensive than heat exchangers which remove heat from fluids having higher pressures. Upon exiting the heat exchanger 14, the cooled and decompressed gas continues in the conduit 11 and returns to the compressor 12, where the cycle repeats. Through this repeated process of compressing and decompressing brake gas, the system of FIG. 1 dissipates unwanted expander energy.

In operation and after repeated cycles, some brake gas may leak out or become otherwise lost through the shaft seal or other parts of the system. The closed-loop conduit 11 has connections 15 and 16 so that the conditions of the gas can be monitored. Such conditions include the pressure, temperature and flow rate of the gas. In order to maintain an adequate amount of brake gas, the system has a control valve 17 that is coupled to a make-up conduit 18. Additional brake gas may be injected into the make-up conduit 18 through the control valve 17, thereby entering the closed-loop conduit 11. As shown in FIG. 1, the control valve 17 and the make-up conduit 18 are disposed between the heat exchanger 14 and the compressor 12. The control valve 17 and the make-up conduit 18 are preferably situated after the pressure reduction valve 13 along the closed-loop path because it is easier to add gas to decompressed gas than to compressed gas. The make-up conduit 18 may be part of the closed-loop conduit 11 or it may be an extension of the conduit 11 and not part of the closed-loop path.

The conduit 11 has an outlet 19 which permits the compressed brake gas to be used for purposes other than circulating through the closed-loop such as for sealing various cavities in the system. A control valve (not illustrated) regulates whether brake gas exits the closed-loop. Again, any lost brake gas is replenished through the control valve 17 and the make-up conduit 18.

Figure 2:
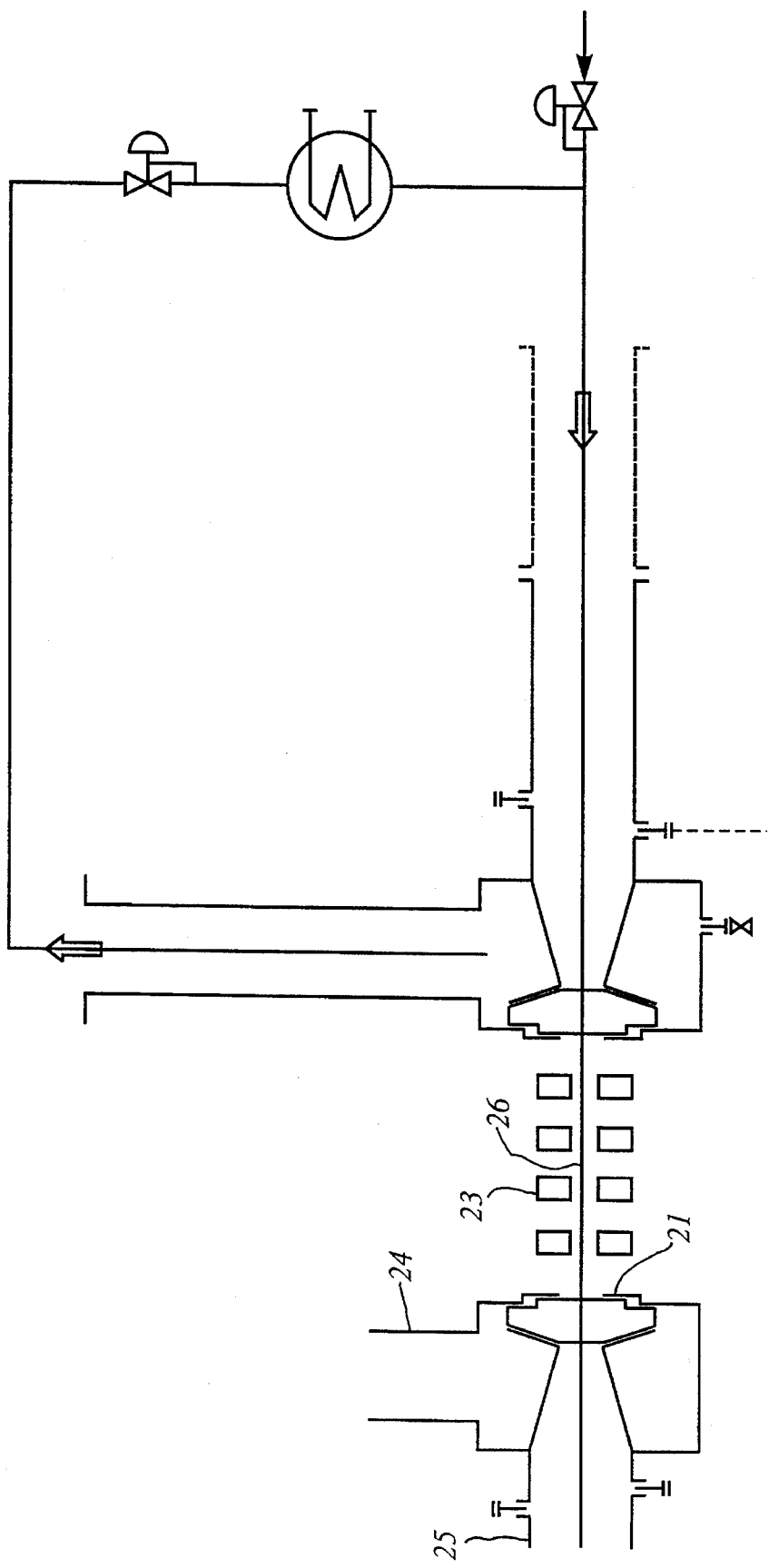
FIG. 2 is a diagram of a system that has a turboexpander, the noncontaminating energy dissipator and bearings.

Turning to FIG. 2, a system that uses a turboexpander 21 and the noncontaminating energy dissipator 10 of the first embodiment is shown, along with magnetic bearings 23.

Pressurized process fluid that is introduced into the inlet 24 of the turboexpander 21 is expanded so that the pressure of the process fluid is reduced to the desired pressure. This process fluid then exits at an outlet 25. The expansion of the process fluid causes a shaft 26 of the turboexpander 21 to rotate, thereby creating the expander energy which drives the compressor 12. The magnetic bearings 23 are located between the turboexpander 21 and the noncontaminating energy dissipator 10. The operation of the noncontaminating energy dissipator 10, as discussed above, expends the unwanted expander energy.

The noncontaminating energy dissipator can be used to expend excess expander energy in such a way as to optimize or alter the operation of the turboexpander. The load created by the closed-loop energy dissipator increases when the differential pressure within the closed-loop is increased. That is, one increases the load by increasing the difference between the pressure of the compressed brake gas leaving the compressor 12 and the pressure of the brake gas after being reduced by the pressure reduction valve 13.

By controlling the differential pressure within the closed-loop energy dissipator, one can adjust the rotational speed of the turboexpander shaft, thereby optimizing the thermal efficiency of the turboexpander. First, one determines whether a greater or lesser load is desired and hence, whether the differential brake gas pressure is to be increased or decreased. If one wants the closed-loop energy dissipator to dissipate more expander energy, the differential brake gas pressure can be increased. If a higher differential pressure level is desired, the user may use a control valve such as the pressure reduction valve 13 in a manner so as to reduce the pressure of the brake gas by a greater amount, or the user may adjust the compressor 12 to compress the brake gas to a higher pressure. On the other hand, if one wants to reduce the amount of expander energy being dissipated, the differential brake gas pressure can be decreased. Similarly, one can decrease the differential brake gas pressure by adjusting the use of the pressure reduction valve 13 or the compressor 12. Controlling the differential brake gas pressure is preferably done by using the pressure reduction valve 13. By adjusting the differential brake gas pressure, one controls the load created by the closed-loop energy dissipator, the speed of the turboexpander and the amount of expander energy expended by the closed-loop energy dissipator. The closed-loop energy dissipator can be operated to achieve the maximum power loss across the turboexpander.

By controlling the differential brake gas pressure in the closed-loop system, one can also control the axial load balancing of the turboexpander. One would determine whether the differential brake gas pressure is to be increased or decreased and adjust the brake gas pressure accordingly. Thus, the thrust load can be adjusted as desired.

Furthermore, the desired differential pressure can be changed as conditions change. In such a case, the monitoring and adjusting of the brake gas pressure can be performed manually or by a computer. Those of ordinary skill in the art can easily program a computer to monitor brake gas pressures and to open and close control valves as necessary to obtain the desired differential pressure.

Although the noncontaminating energy dissipator 10 will work with any kind of bearings, including magnetic, oiled and gas bearings, magnetic bearings are preferred. Gas bearings present additional issues such as filtration, thrust capacity and leakage problems. Oiled bearings, as previously mentioned, are a source of oil migration.

When the noncontaminating energy dissipator 10 is used with magnetic or gas bearings, oil contamination does not occur because no oil source is present. Further, if the brake gas used in the noncontaminating energy dissipator 10 is an inert gas such as nitrogen, hazardous process fluids can be expanded without risk of forming a highly combustible mixture. Thus, the brake gas may be any gas that does not react adversely with the process fluid. In a system that includes oiled bearings, the noncontaminating energy dissipator 10 does not contribute to the contamination of the turboexpander and oil migration is not a problem when the turboexpander is operating. Therefore, an energy dissipator that does not contaminate turboexpanders and also allows the use of hazardous process fluid is disclosed. This closed-loop energy dissipator may also be used so as to alter or optimize the operation of turboexpanders.

Although the present invention has been described in detail and with specific reference to a preferred embodiment, the invention should not be deemed limited thereto, since other embodiments and modifications will readily occur to those skilled in the art. It is therefore understood that the appended claims are intended to cover all such modifications and adaptations that fall within the true spirit and scope of the invention.

What is claimed is:

1. In a fluid circuit having a turboexpander wherein energy is to be dissipated at times from the turboexpander, the improvement comprising a noncontaminating energy dissipating system including
   a compressor mechanically coupled to said turboexpander;
   a pressure reduction valve;
   a heat exchanger; and
   a closed-loop conduit including said compressor, said pressure reduction valve, said heat exchanger and said compressor in seriatim, said heat exchanger configured to dissipate heat from said closed-loop conduit and said turboexpander not being included in said closed-loop conduit.

2. In the fluid circuit of claim 1, the noncontaminating energy dissipator further including
   a make-up conduit including a control valve, said make-up conduit being in communication with said closed-loop conduit.

3. In the fluid circuit of claim 1, said make-up conduit being in communication with said closed-loop conduit between said heat exchanger and said compressor.

4. In the fluid circuit of claim 1, the improvement further comprising an inert brake gas in said closed-loop conduit.

5. In the fluid circuit of claim 4, said inert brake gas is nitrogen.

6. In the fluid circuit of claim 1, said pressure reduction valve is a variable control valve.

7. In the fluid circuit of claim 1, a brake gas flows through said closed-loop conduit.

8. In the fluid conduit, of claim 7, said pressure reduction valve is adjustable for varying pressure of said brake gas in said closed-loop conduit.

9. A method for dissipating rotational energy at times from a fluid circuit having a turboexpander and comprising in seriatim the steps of:

(a) coupling a compressor to a turboexpander;
   (b) compressing a brake gas circulating in a closed-loop energy dissipator to a first pressure by using the compressor;
   (c) expanding said brake gas in said closed-loop energy dissipator to a second pressure;
   (d) removing heat from said closed-loop energy dissipator; and
   (e) returning said brake gas to said compressor.

10. The method of claim 9, said step of removing heat from said brake gas in said closed-loop energy dissipator being performed after said step of expanding said brake gas in said closed-loop energy dissipator to a second pressure.

11. The method of claim 9, said step of expanding said brake gas in a closed-loop energy dissipator includes regulating the difference between said first pressure and said second pressure to balance the loading on the turboexpander.

12. The method of claim 9, said step of expanding said brake gas in a closed-loop energy dissipator includes regulating the difference between said first pressure and said second pressure to control power dissipation.

13. The method of claim 9, said step of expanding said brake gas in a closed-loop energy dissipator includes adjusting the difference between said first pressure and said second pressure to achieve the maximum power loss across the turboexpander.

14. The method of claim 9, said step of expanding said brake gas in a closed-loop energy dissipator includes determining said second pressure so as to achieve the maximum energy loss across the turboexpander.

15. The method of claim 9, further comprising the step of:
   (f) varying the second pressure as operating conditions of the turboexpander change.

* * * * *